March 14, 1961 L. C. HRUSCH 2,974,906
ROTARY STEERING MOTOR
Filed Jan. 29, 1959

INVENTOR.
LOUIS C. HRUSCH
BY
ATTORNEY

# United States Patent Office 2,974,906
Patented Mar. 14, 1961

2,974,906

ROTARY STEERING MOTOR

Louis C. Hrusch, Cleveland, Ohio, assignor to Cleveland Pneumatic Industries, Inc., Cleveland, Ohio, a corporation of Ohio Filed Jan. 29, 1959, Ser. No. 789,980

6 Claims. (Cl. 244—50)

This invention relates to rotary hydraulic motors in general and more particularly to a rotary hydraulic motor structure adapted for use in steering aircraft and the like.

It is an important object of this invention to provide a simple lightweight rotary motor suitable for use in steering aircraft and the like.

It is another important object of this invention to provide a hydraulic rotary motor incorporating continuous unbroken seals.

It is another important object of this invention to provide a seal structure for rotary hydraulic motors which eliminates the problem of sealing in the corners.

It is still another object of this invention to provide a new and improved steering motor for an aircraft.

It is still another object of this invention to provide a vane structure for rotary motors which utilizes one-piece seals eliminating the corner sealing problem.

Further objects and advantages will appear from the following description and drawings, wherein.

Rotary hydraulic motors normally include a shaft having a vane which engages a cylindrical wall to define in part a variable volume chamber to which hydraulic fluid under pressure is supplied. These vanes must engage a peripheral wall and radial walls of the chamber and provide a hydraulic seal therewith. Difficulty has been encountered in providing a seal which will adequately operate at the junction of the peripheral wall and the radial walls at the shaft end of the vane. This problem with rotary motors has caused the use of piston and cylinder types of actuators for aircraft even though rotary motors lend themselves to aircraft steering since they are compact and structurally simple. In a rotary motor according to this invention, the corner sealing problem is eliminated and a dependable compact structure suitable for use in the steering of aircraft and the like is provided. It should be understood that although the rotary motor is shown in conjunction with the aircraft landing gear, the motor itself is suitable for use in other applications.

Figure 1:
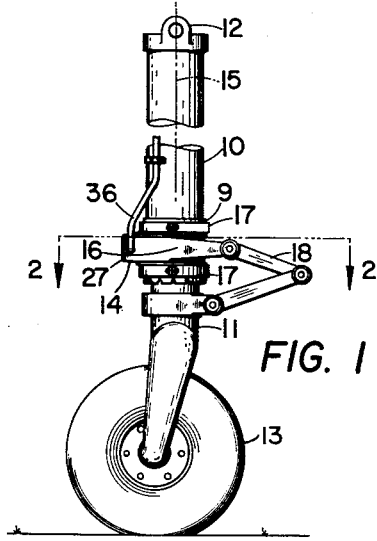
Figure 1 is a view of a landing gear incorporating a steering motor according to this invention.

Referring to the drawings, Figure 1 discloses a typical nose landing gear incorporating a steering motor according to this invention. The landing gear itself includes a shock strut cylinder 10 into which a piston 11 is axially and rotatably movable. The cylinder 10 and piston 11 co-operate to define the usual fluid suspension and damping structure which resiliently supports an aircraft on the ground. The cylinder 10 is adapted to be mounted on the aircraft frame by means of trunnions 12 and a ground supporting wheel 13 is journalled on the piston 11. A steering motor 14 includes a housing 16 clamped to a bearing 9 on the cylinder 10 by straps 17 for rotation relative to the cylinder 10 about the central axis 15 of the strut. The bearing connection between the housing 16 and the cylinder 10 permits rotation of the housing while preventing relative axial movement therebetween. The usual torque arms 18 are connected between the housing 16 and the piston 11 to prevent relative rotation while permitting relative axial movement. Therefore, if the housing 16 rotates relative to the cylinder 10, the piston 11 rotates relative to the cylinder 10 and provides the required steering action.

Figure 2:
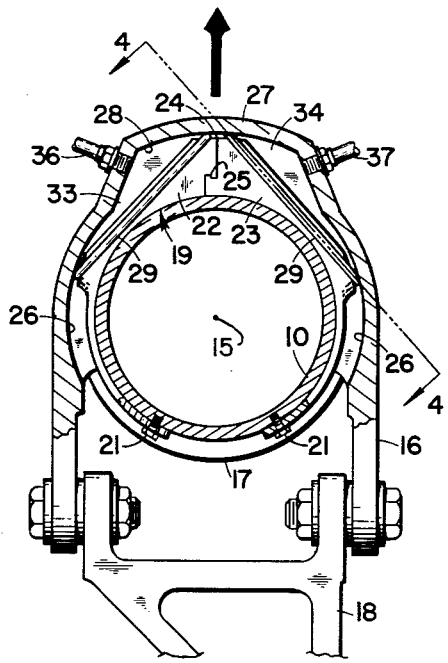
Figure 2 is a cross section along line 2—2 of Figure 1 showing the internal structure of the rotary motor when it is in the neutral or center position.

Referring to Figure 2, the steering motor 14 includes a piston or vane assembly 19 secured to the cylinder 10 by bolts 21. The vane assembly 19 includes two similar co-operating vane elements 22 and 23 which closely fit around the cylinder 10 and co-operate to provide a vane projection terminating at a peripheral section 24. An interlocking key structure 25 in co-operation with the bolts 21 provides a secure mounting of the vane elements 22 and 23. The housing 16 is formed with an inner wall having a cylindrical wall portion 28 within a projection 27 and two similar cylindrical wall portions 26 wherein the radius of the portions 26 is less than the radius of the portion 28. The cylindrical portions 26 and 28 are connected at their ends by fillets 32 (shown in Figure 4) to opposed radial walls 31. Each of the vane elements is provided with a continuous groove in which is positioned an O-ring type seal 29.

Figure 4:
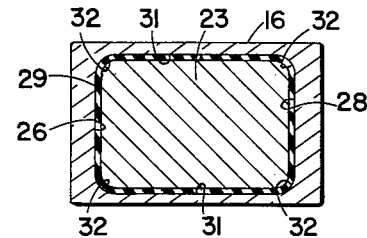
Figure 4 is a section taken along 4—4 of Figure 2 illustrating the seal structure.

As shown in Figure 4, the O-ring seal 29 has a generally rectangular shape with rounded corners corresponding to the fillets 32 and with one end of the rectangle engaging the cylindrical wall 26, the other end of the rectangle engaging the cylindrical wall 28, and the two sides of the rectangle engaging opposed radially extending walls 31. The junction between each of the radial walls 31 and the two cylindrical walls 26 and 28 is formed with a fillet 32 engaged by the rounded corners of the seal so that the seal is not forced into sharp corners. An inspection of this figure will show that the seal 29 is continuous so that there are no sharp corner joints which can introduce leakage. The engagement of the seal 29 positioned on the vane element 22 in co-operation with the housing 16 defines a first variable volume chamber 33 and similarly, the seal 29 on the vane element 23 in co-operation with the housing 16 defines a second variable volume chamber 34. The seals 29 are adjacent to each other at their forward ends where they engage the cylindrical walls 28 and diverge as they extend to the associated walls 26. This structure permits the use of the steering motor on a large shaft such as the strut cylinder 10.

Figure 3:
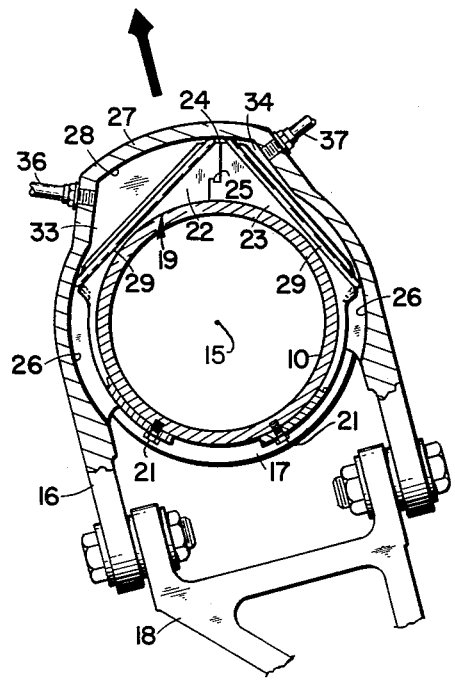
Figure 3 is a view similar to Figure 2 showing the rotary motor in the left-hand extreme position of rotation.

Flexible hydraulic lines 36 and 37 connect to the first and second chambers 33 and 34 respectively. Because the cylindrical wall 28 has a larger radius than the cylinder walls 26, fluid under pressure supplied to the first chamber 33 through the hydraulic line 36 when the hydraulic line 37 is connected to the reservoir return produces counterclockwise rotation of the housing 16 to the position of Figure 3. This is in turn transmitted to the piston 11 through torque arms 18 and results in a steering rotation of the landing wheel 13. The opposite hydraulic connections produce clockwise rotation and will result in clockwise steering rotation of the wheel 13. The torque produced is the pressure times an area equal to the difference in radius between the cylinder wall 26 and the cylinder wall 28 times the axle distance between the two radial walls 31. In normal practice, a suitable four-way control valve is provided to control the flow of hydraulic fluid into the two chambers 33 and 34.

To eliminate any possibility of leakage in all joints and corners which might produce leakage, a structure is utilized which includes a one-piece housing 16. The vane assembly 19 is formed with two vane elements so that the vane elements can be assembled within the housing 16. Preferably, a key type structure shown at 25 is utilized to connect the two vane elements 22 and 23 on their inner side after they have been inserted into the housing 16. The entire structure is then slipped up over the end of the cylinder 10 and the vane elements are connected to the cylinder 10 by the bolts 21 to complete the assembly of the device.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A rotary fluid motor comprising a housing and a vane assembly journalled for relative rotation about an axis, a hollow shaft coaxial with said axis extending through and supporting said vane assembly, said housing being formed with internal walls having first and second cylindrical surfaces coaxial with said axis connected at their ends by opposed surfaces extending radially relative to said axis, the radius of said first surface being greater than the radius of said second surface, a one-piece seal of resilient material on said vane assembly spaced to one side of said shaft engaging said cylindrical surfaces and radially extending surfaces co-operating therewith to define a fluid tight chamber the volume of which is changed by relative rotation between said housing and vane assembly, and a port open to said chamber adapted to admit fluid under pressure into said chamber to produce said relative rotation.

2. A rotary fluid motor comprising a housing and a vane assembly journalled for relative rotation about an axis, a hollow shaft coaxial with said axis extending through and supporting said vane assembly, said housing being formed with inner walls having a pair of similar cylindrical first surfaces and a cylindrical second surface between said first surfaces, the radius of said first surfaces being different from the radius of said second surface, opposed walls extending radially relative to said axis connected to the ends of said first and second surfaces, a first continuous seal on said vane assembly spaced to one side of said shaft engaging said second surface and one of said first surfaces, a second continuous seal on said vane assembly spaced on the other side of said shaft engaging said second surface and the other of said first surfaces, each of said seals engaging said radially extending walls and in co-operation with said housing defining chambers the volumes of which are changed by relative rotation between said vane assembly and housing, and ports communicating with each chamber adapted to admit fluid under pressure thereinto and produce said relative rotation.

3. A rotary fluid motor comprising a one-piece housing and a vane assembly journalled for relative rotation about an axis, a hollow shaft coaxial with said axis extending through and supporting said vane assembly, said housing being formed with inner walls having a pair of similar cylindrical first surfaces and a cylindrical second surface between said first surfaces, the radius of said first surfaces being less than the radius of said second surface, opposed walls radially extending relative to said axis, fillets connecting said opposed walls to the ends of said first and second surfaces, two seal grooves in said vane assembly spaced on opposite sides of said shaft, a first continuous seal in one of said grooves engaging said second surface and one of said first surfaces, a second continuous seal in the other of said grooves engaging said second surface and the other of said first surfaces, each of said seals engaging said radially extending walls and said fillets to define in co-operation with said housing a fluid tight chamber, the volume of one chamber increasing upon relative rotation between said housing and vane assembly in one direction and the volume of the other of said chambers increasing upon such relative rotation in the opposite direction, and ports communicating with each chamber adapted to admit fluid under pressure thereinto and produce said relative rotation.

4. A rotary fluid motor comprising a housing assembly and a vane assembly journalled for relative rotation about an axis, a shaft connected to said vane assembly, said vane assembly including a pair of opposed vane elements, first means connecting said elements on one side of said shaft, second means connecting each element to the side of said shaft opposite said first means, said housing including an inner wall having a pair of similar cylindrical first surfaces and a cylindrical second surface between said first surfaces, the radius of said first surfaces being different from the radius of said second surface, opposed walls radially extending relative to said axis connecting the ends of said surfaces, a continuous seal mounted on each of said elements spaced from said shaft providing sealing engagement with said second surface, one of said first surfaces and said radially extending walls co-operating with said housing to define a chamber the volume of which is changed by relative rotation between said relative assemblies, and a port communicating with each chamber adapted to admit fluid under pressure thereinto and produce said relative rotation.

5. A rotary fluid motor comprising a housing assembly and a vane assembly journalled for relative rotation about an axis, a shaft extending through both of said assemblies, said vane assembly including a pair of opposed vane elements connected by interlocking keys on one side of said shaft, means connecting each element to the side of said shaft opposite said keys, said housing including an inner wall having a pair of similar cylindrical first surfaces and a cylindrical second surface between said first surfaces, the radius of said first surfaces being different from the radius of said second surface, opposed walls radially extending relative to said axis connecting the ends of said surfaces, a continuous seal mounted on each of said elements spaced from said shaft providing sealing engagement with said second surface, one of said first surfaces and said radially extending walls co-operating with said housing to define a chamber the volume of which is changed by relative rotation between said relative assemblies, and a port communicating with each chamber adapted to admit fluid under pressure thereinto and produce said relative rotation.

6. An aircraft landing gear comprising a cylinder adapted to be mounted on the frame of an aircraft, a piston telescoping into said cylinder for axial and rotation movement relative thereto, a ground engaging wheel journalled on said piston, a steering motor including a housing assembly supported by said cylinder for rotation relative thereto a vane assembly mounted around said cylinder, said vane assembly including a pair of opposing vane elements, first means connecting said elements on one side of said cylinder, second means connecting each element to the side of said cylinder of opposite said first means, said housing including an innerwall having a pair of similar cylindrical first surfaces and a cylindrical second surface between said first surfaces, the radius of said first surfaces being different than the radius of said second surface, opposed walls radially extending relative to the axis of said cylinder connecting the ends of said surfaces, a continuous seal mounted on each element spaced from said cylinder providing sealing engagement with said second surface, one of said first surfaces and said radially extending walls cooperating with said housing and associated vane element to define a chamber the volume of which is changed by relative rotation between said assemblies, a port communicating with each cylinder adapted to admit fluid under pressure thereinto to produce said relative rotation, and torque means preventing relative rotation between said housing assembly and piston.

References Cited in the file of this patent

UNITED STATES PATENTS

| | | |
|---|---|---|
| 386,011 | Holmgren | July 10, 1888 |
| 2,508,057 | Bishop | May 16, 1950 |
| 2,597,366 | Nordenstam | May 20, 1952 |
| 2,854,955 | Be Vier | Oct. 7, 1958 |
| 2,891,515 | Briggs | June 23, 1959 |